United States Patent [19]

Okada

[11] Patent Number: 5,259,194
[45] Date of Patent: Nov. 9, 1993

[54] AXLE DRIVING APPARATUS WITH VARIABLE VOLUME RESERVOIR CHAMBER

[75] Inventor: Hideaki Okada, Amagasaki, Japan

[73] Assignee: Kanzaki Kokyukoki Mfg. Co. Ltd., Amagasaki, Japan

[21] Appl. No.: 917,583

[22] Filed: Jul. 21, 1992

[30] Foreign Application Priority Data

Jul. 22, 1991 [JP] Japan .................. 3-181297

[51] Int. Cl.⁵ .............................. F16D 31/02
[52] U.S. Cl. ........................... 60/456; 60/487; 475/83
[58] Field of Search ............... 60/487, 456; 475/83

[56] References Cited

U.S. PATENT DOCUMENTS

| | | |
|---|---|---|
| 4,914,907 | 4/1990 | Okada . |
| 4,932,209 | 6/1990 | Okada et al. . |
| 4,987,796 | 1/1991 | von Kaler et al. ............ 60/478 X |
| 5,040,649 | 8/1991 | Okada . |
| 5,125,291 | 6/1992 | Makita et al. ............... 475/83 X |

FOREIGN PATENT DOCUMENTS 55-65761  5/1980  Japan .................. 60/456
2-54964   4/1990  Japan .

Primary Examiner—Edward K. Look
Assistant Examiner—John Ryznic
Attorney, Agent, or Firm—Sterne, Kessler, Goldstein & Fox

[57] ABSTRACT

An axle driving apparatus in which an oil sump provided in a housing is vertically partitioned into first and second chambers by partition means constructed in the housing. The first chamber is constructed to have an air layer open to the atmosphere, the second chamber is constructed to be always filled with oil. The first chamber and second chamber can flow oil therebetween through an oil introduction passage of the partition means. When oil volume expands by the temperature during the operation of a hydrostatic transmission, while reducing the volume of the air layer in the first chamber, the oil in the second chamber adjustably flows into the first chamber.

5 Claims, 5 Drawing Sheets

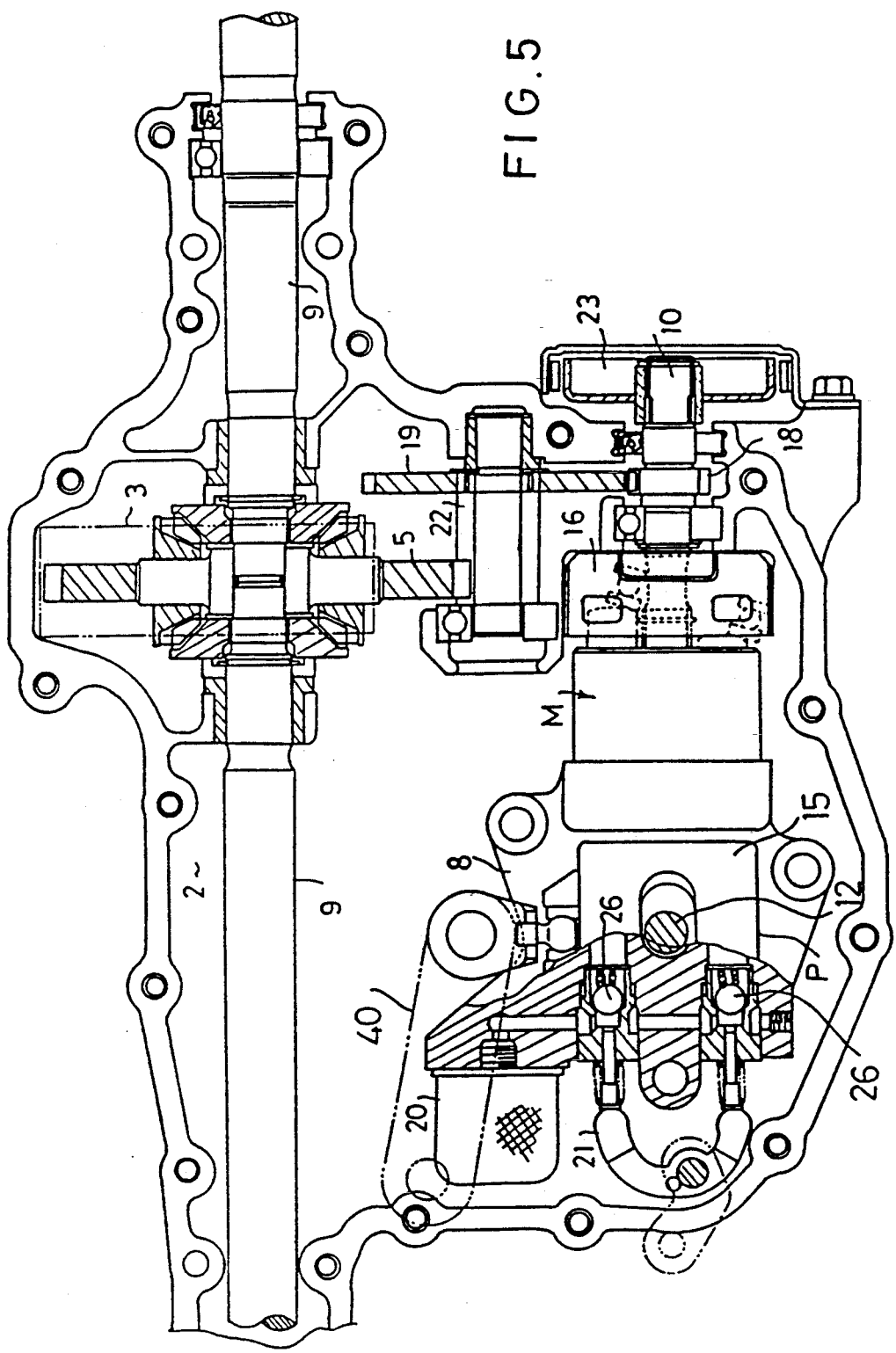

AXLE DRIVING APPARATUS WITH VARIABLE VOLUME RESERVOIR CHAMBER

FIELD OF THE INVENTION

The present invention relates to construction of an oil sump for an axle driving apparatus disposing a hydrostatic transmission within a housing.

BACKGROUND OF THE INVENTION

An axle driving apparatus, which includes a common housing for housing therein a hydrostatic transmission and a pair of axles differentially connected thereto and extending transversely to each other so that an oil sump for storing therein oil for operating the hydrostatic transmission is formed in the housing is well known, as described in U.S. Pat. Nos. 4,914,907, 4,932,209 and 5,040,649.

SUMMARY OF THE INVENTION

The conventional axle driving apparatus is constructed to provide an oil sump for a hydrostatic transmission. When a hydrostatic transmission operates, oil temperature rises, causing the volume of oil in the oil sump to expand, whereby, when the oil sump is entirely filled with oil, there is a fear that oil will leak from the housing.

In the Japanese Utility Model Laid-Open Gazette No. Hei 2-54964, an air layer corresponding to the oil volume expansion is provided at the upper portion of the oil sump. When the hydrostatic transmission operates to agitate oil in the oil sump, air at the air layer mixes with the oil, causing operation trouble, such as cavitation, in the hydrostatic transmission.

Therefore, generally, the oil sump is always entirely filled with oil and surplus volume-expanded oil is collected into a reserve tank communicating with the oil sump through a pipe member.

This method of separately providing the reserve tank makes the entire axle driving apparatus larger, and damage to the connecting pipe must be considered.

The specification of U.S. Pat. No. 4,987,796 discloses therein construction such that in an oil sump is inserted a compressive and expandable member formed from synthetic rubber so that the volume of oil is allowed to expand by compressing and deforming the member to essentially increase in volume. However, in such construction, during a long period of use of such an apparatus, durability or reliability has been a problem.

The present invention has eliminated such inconvenience.

BRIEF DESCRIPTION OF THE DRAWINGS

FIG. 5 is a generally plan view of the axle driving apparatus.

DESCRIPTION OF THE PREFERRED EMBODIMENT

An axle driving apparatus has a hydrostatic transmission to be detailed below and a common housing A for transaxle components, the housing A comprises an upper housing part 1 and a lower housing part 2, the two parts being coupled with each other through separate coupling surfaces.

The common housing A contains therein the hydrostatic transmission and houses the transaxle components.

The housing A also forms a common oil sump for the hydrostatic transmission and transaxle components. Oil collected in the housing A is used for operating the hydrostatic transmission and lubricating parts of the transaxle components.

In addition, the oil sump may independently be formed into an operating oil sump used only for the hydrostatic transmission and a lubricating oil sump used only for the transaxle components.

Figure 3:
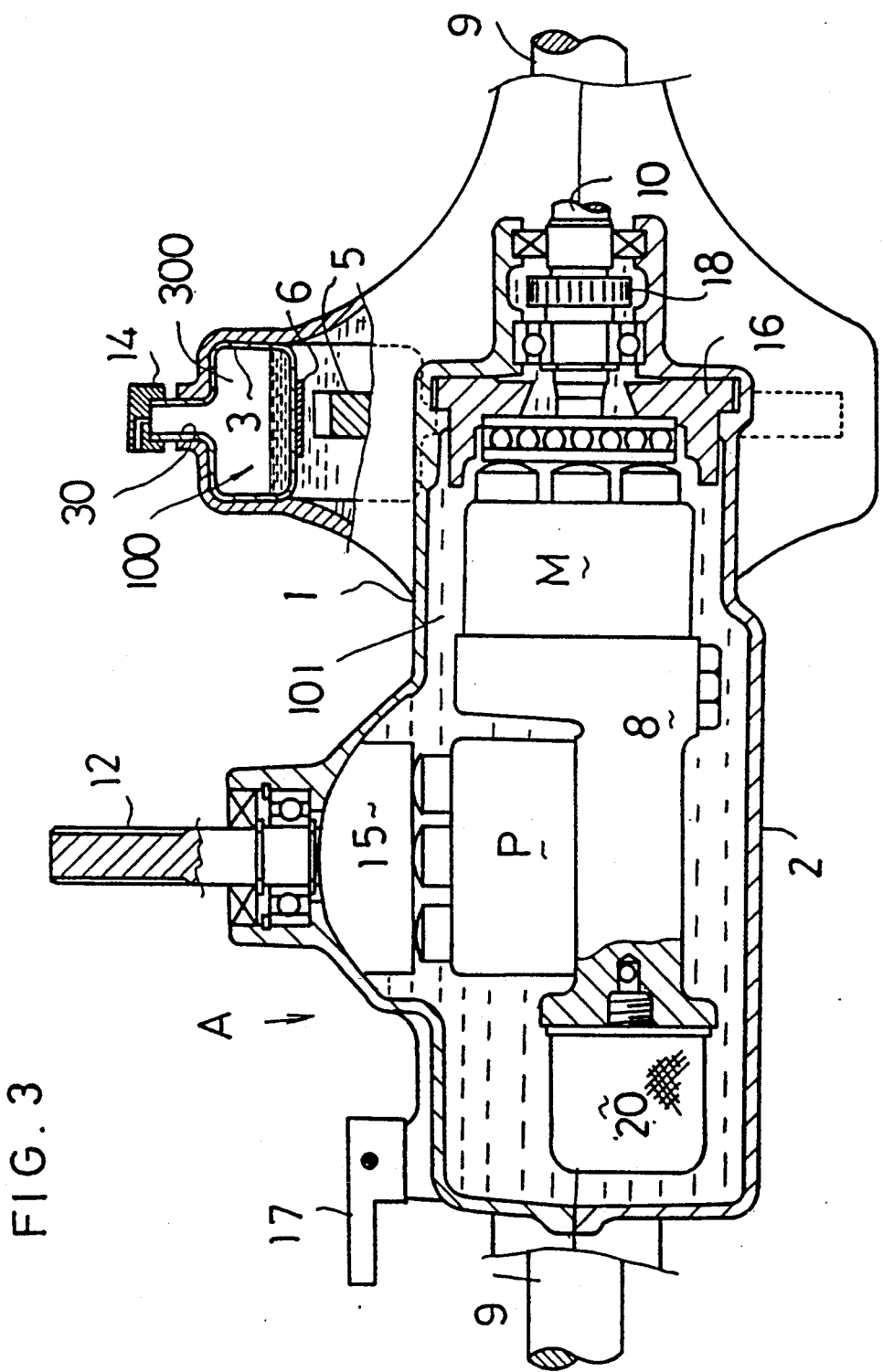
FIG. 3 is a sectional view of a part of hollow molded container 3 in a direction parallel to an axle 9.
Figure 4:
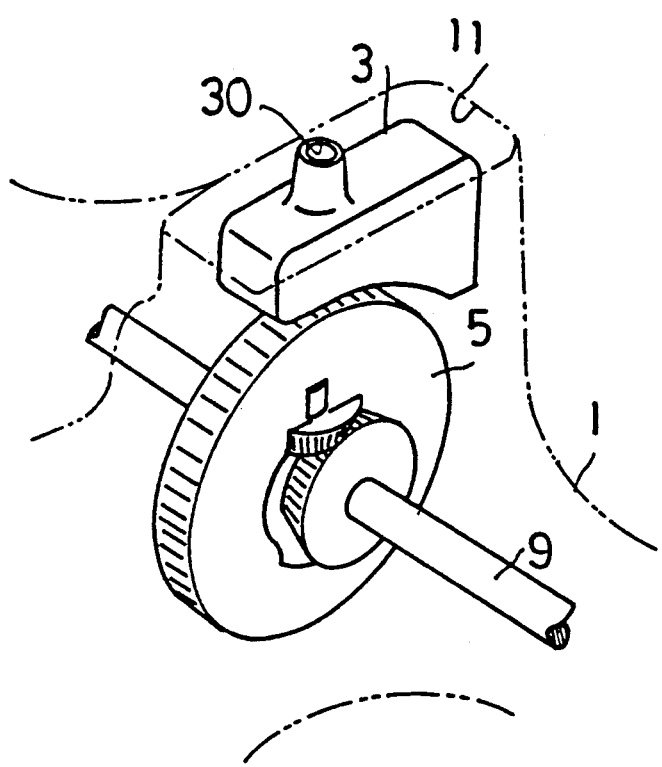
FIG. 4 is a generally perspective view of an input ring gear 5 and part of the hollow molded container 3.

As shown in FIG. 3, the above-mentioned hydrostatic transmission comprises a combination of a hydraulic pump P, a center section 8, and a hydraulic motor M, and is soaked in the oil sump.

The hydraulic pump P uses a variable capacity axial piston machine, whose pump shaft 12 is given power from a vehicle engine not shown. The angle of a movable swash plate is adjusted by a speed change arm 40 (see FIG. 5) so as to vary pump capacity. As shown in FIG. 3, the movable swash plate 15 is held at the rear surface thereof by a concave surface of part of the upper housing 1, thereby being slidable clockwise and counterclockwise around the pump shaft 12.

The hydraulic motor M uses a fixed capacity axial piston machine, whose motor shaft 10 is connected in association with transaxle components. An axis of the motor shaft 10 is positioned in the same plane as the separate coupling surface of the housing A and the motor shaft 10 extends through an opening of a fixed swash plate 16 and is journalled to the housing A by part of the upper housing 1 and part of the lower housing 2, the fixed swash plate 16 being sandwiched between the upper housing part 1 and the lower housing part 2 and is non-movably fixed.

In the center section 8 are rotatably mounted cylinder blocks of the hydraulic pump P and hydraulic motor M in relation of intersecting substantially at a right angle with each other, the center section 8 being substantially L-like shaped and mounted inside the upper housing 1 and positioned in the oil sump. An oil passage (not shown) for circulating the operating oil between the hydraulic pump P and the hydraulic motor M is formed within the center section 8. As above-mentioned, pressure oil discharged from the variable capacity hydraulic pump P is supplied to the hydraulic motor M through the oil passage, thereby obtaining variable speed.

The hydrostatic transmission is soaked in the oil sump so that oil leaking from the hydrostatic transmission is directly returned to the oil sump. When the operating oil for the hydrostatic transmission is low due to oil leakage, the oil, after being filtered by an oil filter 20, is taken into the interior of the center section 8 and one of a pair of check valves 26 (FIG. 5) is automatically opened, so that the oil is mixed with circulating low pressure side oil. As shown in FIGS. 3 and 5, oil filter 20 is mounted to the side surface of center section 8 and suspended in the oil sump.

In addition, when forced short circuit arm 21 (FIG. 5) is operated from the exterior of housing A, the pair of check valves 26 can forcibly be opened, thereby enabling an output of the hydrostatic transmission to be cut off.

The above-mentioned transaxle component is provided with a pair of axles 9 extending transversely to each other. The axles 9 each project at the end thereof from the housing A. A driving wheel of a vehicle (not shown) is mounted on each axle. The axis of each axle 9 is positioned in the same plane with the separate coupling surface of the housing A, the axles 9 being rotatably supported by bearings put between the upper housing part 1 and the lower housing part 2 respectively.

A differential gear for differentially coupling the pair of axles 9 is provided so as to be coupled at the inner ends with each other, which is provided with an input ring gear 5 engageable with an input gear 22 at a reduction gear apparatus.

An input gear 19 at the reduction gear apparatus engages with an output gear 18 provided at the motor shaft 10. Reference numeral 23 designates a brake apparatus for applying the braking effect to the axles 9.

The housing A of the axle driving apparatus for housing therein the hydrostatic transmission forms an oil sump for operating the hydrostatic transmission. The present invention is so designed to allow the volume of oil in the oil sump to expand in the housing according to the temperature during the operation of the hydrostatic transmission by means of the following construction.

Figure 1:
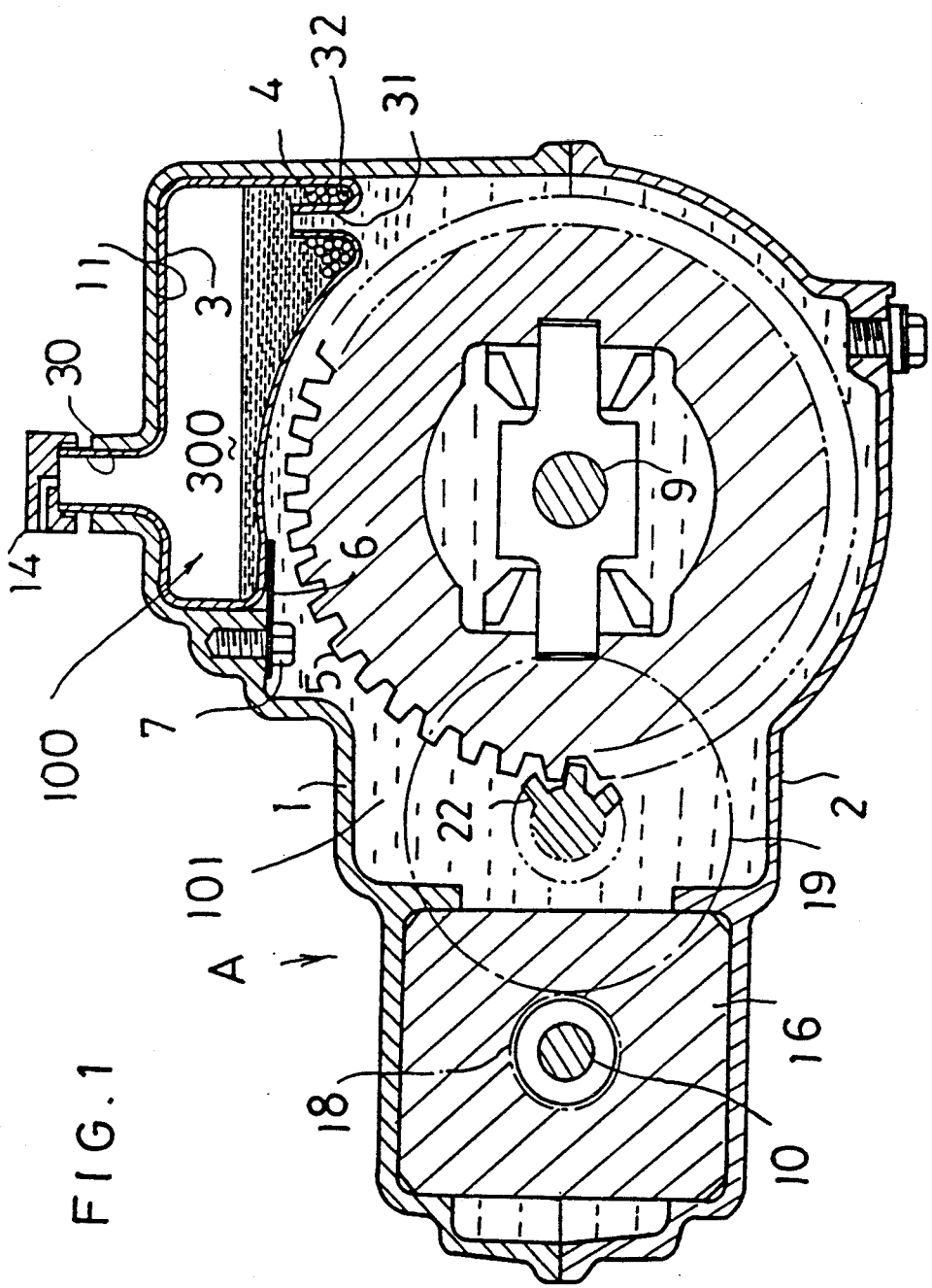
FIG. 1 is a sectional side view in part of a hollow molded container 3 of an axle driving apparatus of the present invention.
Figure 2:
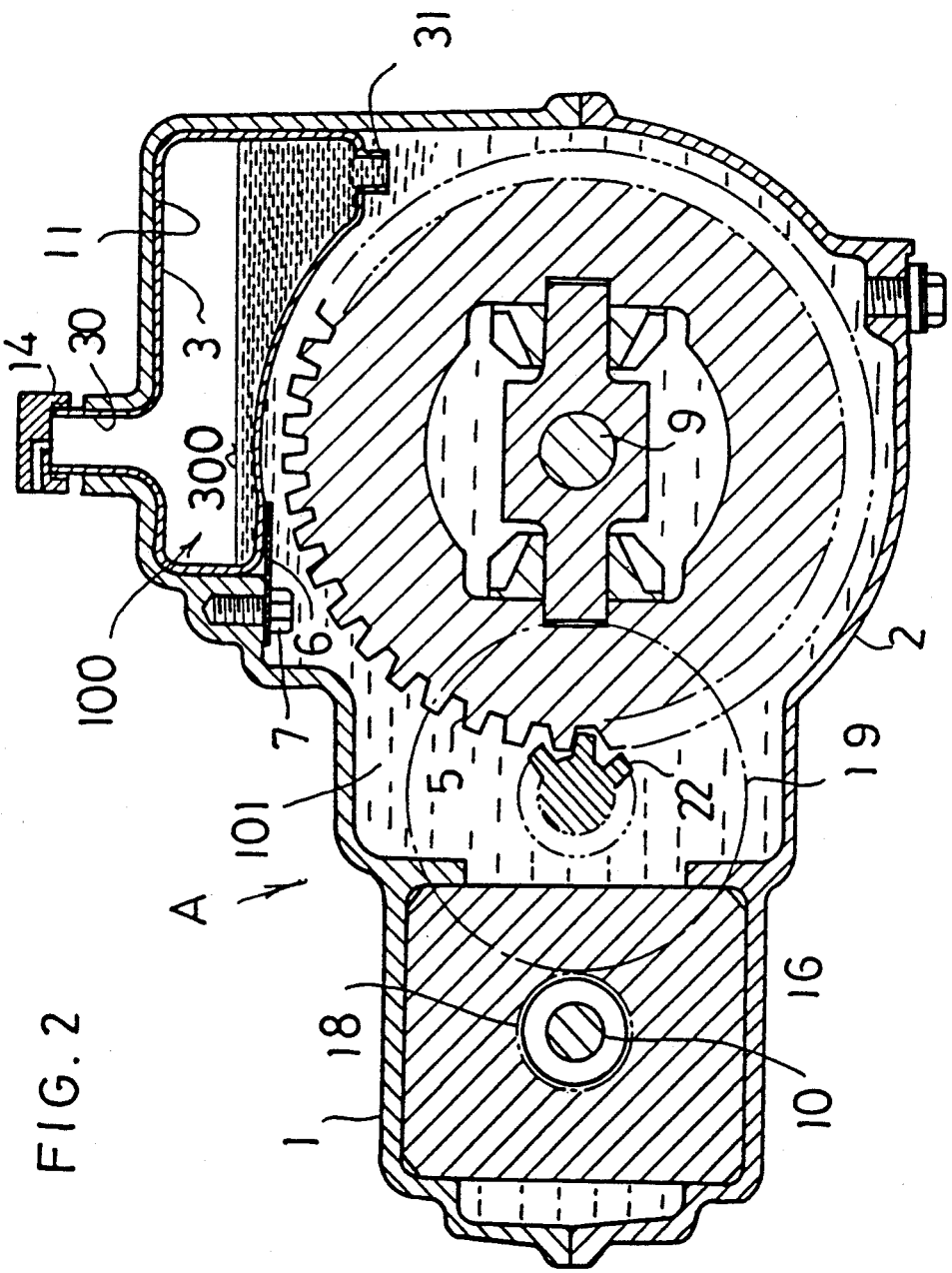
FIG. 2 is a sectional view of a modified embodiment of part of an oil introduction portion 31 provided in the hollow molded container 3.

As shown in FIG. 1, partition means is provided which vertically partitions the oil sump provided at a side of the upper housing part 1 of the housing A into two chambers, first and second chambers 100 and 101. The partition means is constructed by part of a hollow molded container 3 in the embodiment of the present invention.

The first chamber 100 is so constructed to have an air layer 300 open to the atmosphere and the second chamber 101 always filled with oil. Both the first and second chambers 100 and 101 are capable of communicating with each other to flow oil through an oil introduction portion or passage 31 provided at the partition means of hollow molded container 3.

When the volume of oil expands during the operation of the hydrostatic transmission, oil in the second chamber 101 flows into the first chamber 100, thus adjusting to the increased oil volume by reducing the volume of the air layer 300 in the first chamber 100.

Accordingly, the second chamber 101 is always filled with oil, and is used as the oil sump in which the hydrostatic transmission is soaked. The air layer 300 for adjusting to the change in volume of the oil is provided in the first chamber 100, separated by the partition means from the oil sump. Even when the oil in the oil sump (second chamber 101) is agitated by operation of the hydrostatic transmission, air in the air layer 300 is not mixed in the oil, thus preventing the hydrostatic transmission from causing operation fault, such as by cavitation.

The axle driving apparatus of the present invention constructed as the above-mentioned need not separately provide the conventional reserve tank, so that the entire axle driving apparatus can be miniaturized and the durability and reliability thereof are improved.

The partition means comprises a hollow molded container 3, which is not integral with the upper housing 1, but uses a separate member and is fixedly mounted by a fixing bolt 7 at a predetermined position in the oil sump, thereby forming the first and second chambers 100 and 101.

Therefore, it is advantageous that, when the upper housing 1 is molded by die casting, its trimming die is easy to form.

The partition means uses a hollow molded container 3 formed of synthetic resin material which is resistant to thermal deformation and which is easy to machine. The partition means may be modified, for example, to form the partition wall integrally with the housing A or be plate-like-shaped to be mounted therein without departing from the spirit of the present invention.

Within the upper housing 1, and above the input ring gear 5 of the differential gear, is formed a recess 11 about equal in size to the volume of hollow molded container 3, the recess 11 being non-machine-wrought integrally with the upper housing 1 when manufactured by die casting, and housing the hollow molded container 3 constituting the partition means.

The bottom of hollow molded container 3 substantially constitutes the partition means, and is formed in a circular arc circumferentially of the input ring gear 5. A fixed plate 6 connected to the upper housing 1 by the fixed bolt 7 is attached to a proper portion of the bottom of hollow molded container 3 so as to prevent the container 3 from falling.

At the upper portion of the hollow molded container 3 is formed an atmosphere introduction portion or passage 30 in a pipe-like shape, and its end perforates the upper housing 1 and projects to the exterior of the housing A. Liquid packing is applied between the recess 11 of upper housing 1 and the outer surface of the hollow molded container 3 so not to allow a foreign object, such as water, to enter into the housing A from around the perforating portion.

Under the bottom or lower portion of hollow molded container 3 is formed an oil introduction portion or passage 31 in a pipe-like shape for freely flowing oil to the interior and exterior of the container 3.

The above-mentioned construction of the present invention forms within the hollow molded container 3 the first chamber 100 having therein the air layer 300, whereby the air layer 300 is separated from the oil sump. Oil can mutually flow between the first chamber 100 and the second chamber 101 as the two chambers are connected by reliable, simple and inexpensive means.

The end of the atmosphere introduction portion 30 is positioned external to the upper housing 1 and a detachable breather or air exchange member 14 is mounted to the end.

When the oil volume expands, only air is exhausted through the breather 14 from the air layer 300 in the hollow molded container 3 so that, even when the axle driving apparatus shakes, oil in the hollow molded container 3 never leaks therefrom.

When the axle driving apparatus is assembled, the breather 14 is removed from the atmosphere introduction portion 30, and oil is charged into the hollow molded container 3 and then discharged to the oil sump outside the hollow molded container 3 through the oil introduction portion 31 and is filled in the second chamber 101. Thereafter, some quantity of oil stays in the hollow molded container 3 and the air layer 300 is formed at the upper portion thereof.

As shown in FIG. 1, in order to provide a recess 32 at the bottom of the hollow molded container 3, the pipelike-shaped oil introduction portion 31 is formed in a manner of being folded inwardly of the container 3. When the oil is cooled, its volume compresses so that the water content 4 in the air taken into the hollow molded container 3 through the breather 14 enters into the oil. The water content 4 is stored in the recess 32 at the hollow molded container 3 so as not to be discharged to the second chamber 101 through the oil introduction portion 31, thereby preventing the hydrostatic transmission from being affected harmfully.

What is claimed is:

1. An axle driving apparatus comprising:
   a housing;
   a hydrostatic transmission disposed within said housing;
   an axle disposed within said housing connected to said hydrostatic transmission;
   an oil sump defined by said housing for storing operating oil for said hydrostatic transmission;
   partition means for separating said oil sump into a first oil chamber and a second oil chamber, said partition means including an oil passage so that said first and said second oil chambers are in fluid communication; and
   an air layer formed in said first oil chamber in communication with the atmosphere so that when a volume of oil in said second oil chamber increases, oil flows from said second oil chamber into said first oil chamber thereby decreasing the volume of said air layer.

2. An axle driving apparatus as recited in claim 1, wherein said partition means is fixedly attached to said housing at a predetermined position within said oil sump.

3. An axle driving apparatus as recited in claim 2, wherein said partition means comprises:
   a hollow molded container disposed in a recess within said oil sump, said container defining said first oil chamber, the upper portion of said container including an air passage and the lower portion of said container including said oil passage.

4. An axle driving apparatus as recited in claim 3, further comprising:
   an air exchange member removably attached to one end of said air passage, said one end being external to said housing; and
   wherein said container is configured to form a recess at said lower portion for trapping water from air introduced into said container through said air exchange member.

5. An axle driving apparatus as recited in claim 1, wherein said volume of oil in said second oil chamber always fills said second oil chamber.

* * * * *